US008003576B2

(12) United States Patent  (10) Patent No.: US 8,003,576 B2
McDonald  (45) Date of Patent: Aug. 23, 2011

(54) FRICTION MODIFIER FOR DRILLING FLUIDS

(75) Inventor: Michael J. McDonald, Toronto (CA)

(73) Assignee: The Lubrizol Corporation, Wickliffe, OH (US)

( * ) Notice: Subject to any disclaimer, the term of this patent is extended or adjusted under 35 U.S.C. 154(b) by 0 days.

(21) Appl. No.: 12/639,300

(22) Filed: Dec. 16, 2009

(65) Prior Publication Data

US 2010/0152067 A1   Jun. 17, 2010

Related U.S. Application Data

(60) Provisional application No. 61/122,877, filed on Dec. 16, 2008.

(51) Int. Cl.
*C09K 8/22* (2006.01)
*C09K 8/04* (2006.01)
*C07F 9/165* (2006.01)

(52) U.S. Cl. ........ 507/128; 507/127; 507/129; 507/134; 507/135; 507/136; 507/139; 507/140; 507/141; 507/145; 556/25

(58) Field of Classification Search ............... 507/128, 507/127, 129, 134, 135, 136, 139, 140, 141, 507/145; 556/25
See application file for complete search history.

(56) References Cited

U.S. PATENT DOCUMENTS

| 3,410,797 | A |   | 11/1968 | Walker et al. | |
|---|---|---|---|---|---|
| 4,064,056 | A |   | 12/1977 | Walker et al. | |
| 5,198,129 | A |   | 3/1993 | Hata | |
| 2001/0036905 | A1 | * | 11/2001 | Parlar et al. | 507/200 |
| 2002/0137635 | A1 | * | 9/2002 | Langlois | 507/110 |
| 2004/0063588 | A1 | * | 4/2004 | Rose et al. | 507/103 |
| 2007/0125542 | A1 | * | 6/2007 | Wei et al. | 166/308.2 |

FOREIGN PATENT DOCUMENTS

| EP | 0340323 A1 | 11/1989 |
|---|---|---|
| WO | 2007065872 A1 | 6/2007 |

OTHER PUBLICATIONS

International Search Report dated Feb. 16, 2010 for PCT/US2009/068193 (Forms PCT/ISA/220 and PCT/ISA/210).
Written Opinion of the International Searching Authority for PCT/US2009/068193 (Form PCT/ISA/237).

* cited by examiner

*Primary Examiner* — Timothy J. Kugel
(74) *Attorney, Agent, or Firm* — Christopher D. Hilker; David M. Shold

(57) ABSTRACT

This invention relates to improved lubrication in drilling and completion fluids used in subterrane drilling for oil and gas. The addition of zinc dialkyl dithiophosphate (ZDDP) acts as a lubricant, an enhancer to other lubricants and rate of penetration enhancer.

13 Claims, 1 Drawing Sheet

FRICTION MODIFIER FOR DRILLING FLUIDS

This application claims priority to U.S. Provisional Patent Application No. 61/122,877, filed on Dec. 16, 2008, now expired.

BACKGROUND OF THE INVENTION

1. Field of the Invention

Embodiments of the invention related to friction modifiers for use with non-sulfurized lubricants used in drilling fluids.

2. Description of the Related Art

During the drilling of an oil and gas well, a specialized fluid referred to as a drilling fluid or alternatively a "mud" is circulated through the drill pipe and bit. The principal functions of a drilling fluid include: stabilizing geological formations, providing hydrostatic pressure, cooling the drill bit, and carrying drill cuttings beneath the bit to transport them up to the surface for separation. The other key function of a drilling fluid is to act a lubricant between the drill pipe and the borehole and/or metal casing. The drilling fluid also acts as a lubricant for the drill bit.

Drilling fluids can be categorized as being either water-based or oil-based. In general, water-based drilling fluids are lower cost and have much better health, safety and environmental performance than oil-based drilling fluids. However, oil-based fluids offer excellent shale stabilization and provide for lower co-efficient of friction. Certain water based drilling fluids such as sodium and potassium silicate based drilling fluids can match the shale inhibition properties but not the coefficient of friction (CoF) of oil based drilling fluids.

The lubricity of a drilling fluid is an important property as it determines the torque (rotary friction) and drag (axial friction) in the wellbore. There are numerous economic and technical reasons for wanting to lower the coefficient of friction of the drilling fluid. Reduction in torque and drag results in:

- faster drilling rates and, therefore, reduced cost
- wells of greater depth and length
- more complex well profiles
- substitution of oil-based drilling fluids for water-based drilling fluids Given the numerous benefits of lower torque and drag, it is very common to add a chemical or mechanical lubricant to a drilling fluid to lower the CoF. There is extensive prior art on chemical and mechanical lubricants for lowering CoF in drilling fluids. Examples of commonly used chemical lubricants include hydrocarbons, synthetic oils, esters, fatty acids, natural oils, and surfactants as well as other compounds.

A common problem encountered in drilling is accretion which occurs when partially hydrated drill cuttings stick to the drill string. Preferably, a lubricant will have anti-accretion properties. Anti-accretion properties are desirable in a lubricant because they can provide further reductions in friction. Anti-accretion additives are also referred to as rate of penetration enhancers.

Zinc dialkyl dithiophosphate (ZDDP) is a commonly used additive for motor oils. ZDDP functions as an anti-wear additive by reacting with a metal surface under conditions of temperature and/or pressure. ZDDP decomposes under high temperature and/or rubbing to form a polyphosphate layer that acts as an anti-wear film. This film accommodates and redistributes applied load which reduces wear of the underlying surface. Ancillary properties of ZDDP in motor oil include anti-corrosion.

Although primarily a motor oil additive, ZDDP has seen extremely limited use in drilling fluid lubricants. U.S. Pat. No. 3,712,393 to Sheldahl, et. al. describes the addition of ZDDP to a drilling fluid lubricant composed of sulfurized lard oil, mineral oil and halogenated paraffin. Corrosion inhibitors, wear inhibitors, oxidation stabilizers and odor stabilizers can also be added to the lubricant. ZDDP functions as a wear inhibitor in this composition. The added ZDDP does not function to improve lubricity since, as shown below, sulfurized based lubricants represent one of the few classes of lubricants that do not show a lower CoF with the addition of ZDDP.

U.S. Pat. No. 4,064,056 to Walker, et al. describes a lubricant composition containing from 13 to 15% sodium salts of petroleum sulfonic acids and from 70 to about 82% petroleum oil carrier. ZDDP, among other additives, is added to the mineral oil at a concentration of from 0% to about 1.1% to improve anti wear and antioxidant properties. The presence of sulfurized compounds in the lubricant composition would not allow for ZDDP to impart improvements in lubricity.

BRIEF SUMMARY OF THE INVENTION

It has been discovered that torque and drag in a drilling fluid can be further reduced when a minor amount of ZDDP is added to the drilling fluid or used in combination with other lubricants. Because of its surface chemical properties, ZDDP preferentially films on a metal surface and prevents clay adhesion. The ZDDP film has lubricant properties but it can also act as a coupling agent for other lubricants. Results are most dramatic in drilling fluids that contain additives that compete for metal surface sites and/or disrupt the film forming properties of traditional lubricants. Further, the ZDDP film helps minimize the sticking of drill cuttings onto the drill string. Reduction in co-efficient of friction is particularly evident when the invention is applied in a silicate based drilling fluid.

ZDDP consists of zinc bound to diphosphordithioic acid with alkyl or alkaryl ester substituent groups. The alkyl groups are saturated hydrocarbons that vary in length from C3-C12. The basic chemical structure of ZDDP is shown below. The chemical category of ZDDP can be divided into twelve products that share similar structure types. Substantially any ZDDP could be used in a drilling fluid.

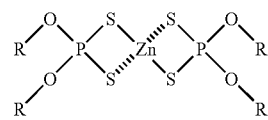

It is anticipated that improvements in lubricity could also be achieved with monothiophosphates and polythiophosphates of cadmium, tin, iron, cobalt, nickel, vanadium, chromium, manganese, molybdenum, tungsten, titanium and zirconium.

DETAILED DESCRIPTION OF THE INVENTION

Figure 1:
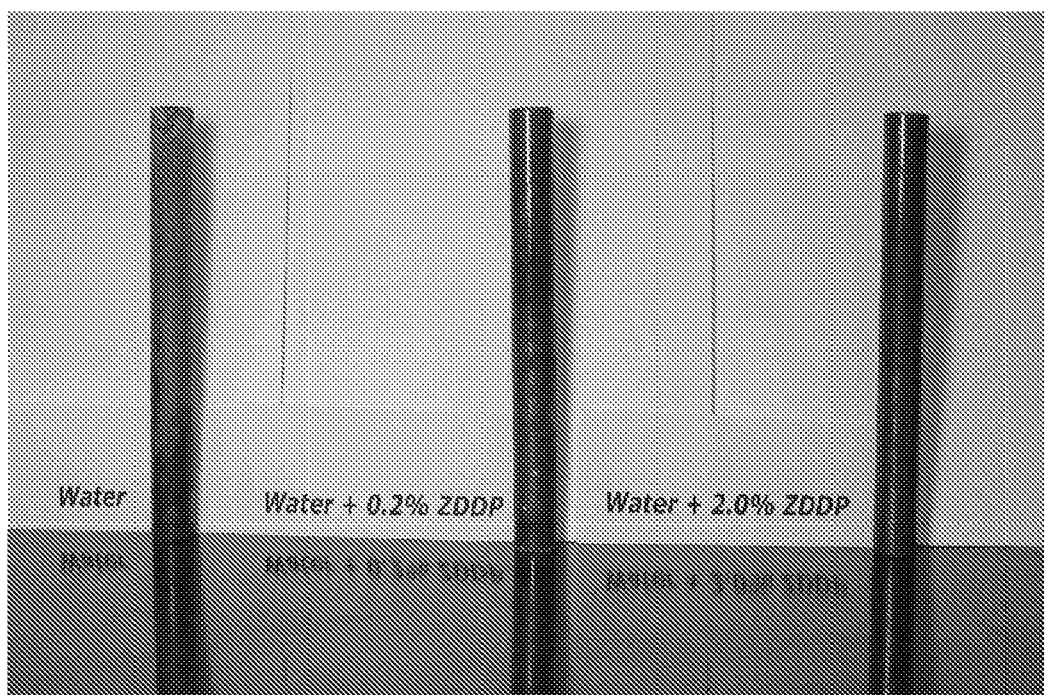
FIG. 1 is a photograph showing the effect of different amounts of ZDDP additive in a lubricant on preventing the adhesion of clay on a steel rod.

Alkali silicate -based drilling fluids were selected as the initial drilling fluid since they are known to have a high CoF and are often used by the industry as an environmentally friendly alternate to oil based drilling fluids. The high CoF of silicate based drilling fluids is the result of silicate adhesion to metal. The efficacy of ZDDP was also tested in other families of water-based drilling fluids known for shale inhibition. These family of water-based drilling fluids include; glycol-based, amine-based and formate-based fluids. It is anticipated that the efficacy of this invention would be observed in other water based drilling fluids.

ZDDP could be added to any commonly used class of drilling fluid lubricants, the notable exception being sulfurized based lubricants. Table 1a, lists the different lubricants tested in combination with ZDDP.

TABLE 1a

Drilling Fluid Lubricants

| Manufacture | Brand | Chemistry |
|---|---|---|
| Shrieve | BioAdd 751 | Modified vegetable ester |
| Croda | Estadril L100 | Phosphate ester |
| Cognis | Dehylube 1000 | Fatty acid ester |
| Oleon | Radiagreen SL | Mixture of fatty esters and specialties |
| Houghton | DHM 07-24 | Esters, sulphonated additive, phosphate additive |
| Halliburton | NXS | Sulferized olefin |
| Chemax | HPH-1 | di-ester |
| Stepan | drewmulse | gylcerol monoleate |
| Western Biodiesel | — | Biodiesel |
| Sun | Coastal Lube | polyalphaolefin (PAO) |
| | Graphite | Graphite |
| BriChem | EZ Drill XL | Vegetable oil additives |
| CIBA | Alcomer 120 L | High molecular weight, liquid anionic polymer |
| Gumpro | Gel Sil EPL | Treated vegetable oil and paraffin oil |

In the search for oil and gas, the industry trend is towards wells of greater length and depth. Oil-based drilling fluids are being challenged to provide lower CoF. ZDDP was tested as an extreme pressure lubricant in oil-based drilling fluids.

The lubricity of the drilling fluid and lubricant was measured using Extreme Pressure Lubricity Tester (i.e. surface to surface drag test). This is a common lubricity test that measures co-efficient of friction between a steel block and a rotating steel ring immersed in a drilling fluid. The standard test involves the application of 150 in-pounds of torque applied to the test block. The ring rotates at 60 rpm. The lubricity tester is allowed to run for at least 5 minutes at which point a friction coefficient reading is taken. The drilling fluid samples are sheared at high speed for 5 minutes prior to testing.

Given the wide range of drilling fluid types as well as lubricants, it was not possible to illustrate the efficacy of ZDDP under every combination. Other aspects, object and advantages of the present disclosure will become apparent to those skilled in the art from this disclosure and claims.

EXAMPLE 1

Synergistic Effect of ZDDP with Other Lubricants

ZDDP was added to a broad cross-section of drilling fluid lubricants. The ZDDP-enhanced lubricant was prepared by adding 5.0 g of ZDDP into 95 g of lubricant and stirring. The ZDDP readily mixed into the lubricant at room temperature. In the case of graphite, 20 g of ZDDP was mixed into 80 g of graphite.

Reduction in CoF was measured on a potassium silicate based drilling fluid prepared in the lab according to Table 1b. Lubricants were tested in the drilling fluid at a concentration of 2% wt/wt (i.e. 10 g lubricant into 500 g drilling fluid). A 2% lubricant loading was chosen as a reasonable concentration for initial testing. Lubricant and drilling fluid were shear mixed and then hot rolled for 16 hrs@120 F. Table 1c indicates the friction readings and % reduction in coefficient of friction. Notably, no reduction in the CoF was achieved by adding ZDDP to NXS, a sulfurized lubricant.

TABLE 1b

Base Drilling Fluid

| Water | 920 ml |
|---|---|
| Potassium Silicate (PQ Corp. EcoDrill ® 317) | 80 ml |
| Xanthan gum | 2 g |
| Starch | 2 g |
| PAC | 2 g |
| Rev Dust | 30 g | chemical components were added under agitation at room temperature. The drilling fluid was then aged by hot rolling for 24 hrs at 120 F.

TABLE 1c

Reduction in Coefficient of Friction
Coefficient of Friction

| | Lubricant | Lubricant:ZDDP |
|---|---|---|
| Drilling Fluid (no lubricant) | 0.48 | |
| 2% ZDDP | 0.32 | |
| 2% Dehylube 1000 | 0.37 | 0.24 |
| 2% Biodiesel | 0.37 | 0.26 |
| 2% Dremulse | 0.39 | 0.29 |
| 2% BioAdd 751 | 0.33 | 0.26 |
| 2% Radiagreen SL | 0.36 | 0.23 |
| 2% Estadrill L100 | 0.38 | 0.16 |
| 2% HPH-1 | 0.18 | 0.15 |
| 2% Graphite* | 0.38 | 0.32 |
| NXS | 0.24 | 0.24 |
| DHM 07-24 | 0.17 | 0.16 |

*ratio of graphite to ZDDP was 8:2

EXAMPLE 2

Reduction in Friction in a Sodium Silicate-based Drilling Fluid

Reduction in CoF was measured on a sodium silicate-based drilling fluid. The drilling fluid was formulated in a similar manner as Table 1b, except potassium silicate was substituted for sodium silicate (PQ Corporation, N® grade). Lubricants were mixed with ZDDP at a ratio of 9:1. Lubricants were added to the drilling fluid at a concentration of 2% wt/wt (i.e. 10 g of lubricant was added 500 g of drilling fluid). Lubricant and drilling fluid were shear mixed and then hot rolled for 16 hrs@120 F. Table 2 shows that the addition of ZDDP to the lubricant resulted in a reduction in the CoF of the lubricant.

TABLE 2

Coefficient of Friction in Sodium Silicate Drilling Fluid
Coefficient of Friction

| | No ZDDP | Lubricant:ZDDP (9:1) |
|---|---|---|
| No Lubricant | 0.48 | 0.48 |
| 2% Radiagreen SL | 0.33 | 0.18 |
| 2% Estadrill L100 | 0.43 | 0.23 |

TABLE 2-continued

Coefficient of Friction in Sodium Silicate Drilling Fluid
Coefficient of Friction

|  | No ZDDP | Lubricant:ZDDP (9:1) |
|---|---|---|
| 2% HPH-1 | 0.46 | 0.27 |
| 2% Gumpro | 0.34 | 0.25 |
| 2% Coastal Lube | 0.48 | 0.34 |
| 2% EZ Drill XL | 0.43 | 0.36 |
| 0.5% Alcomer 120 | 0.44 | 0.33 |

EXAMPLE 3

Lubricant Concentration vs. Coefficient of Friction

A sample of potassium silicate based drilling fluid was obtained from a well site in Western Canada. The drilling fluid contained 6.5% potassium silicate by volume and remainder being water, polymers and drill solids. Estadril was blended 19:1 with ZDDP on a wt/wt basis. Lubricant was added to the drilling fluid on a 2% wt/wt basis. Table 3 shows that a 0.5% loading of ZDDP enhanced lubricant had a similar CoF as a 2% loading of lubricant.

TABLE 3

Concentration vs. CoF
Coefficient of Friction

|  | No ZDDP | Lubricant:ZDDP (19:1) |
|---|---|---|
| No Lubricant | 0.45 | 0.45 |
| 0.5% Estadrill | 0.35 | 0.29 |
| 1% Estadrill | 0.34 | 0.24 |
| 2% Estadrill | 0.29 | 0.21 |
| 4% Estadrill | 0.25 | 0.19 |

EXAMPLE 4

Order of Addition

ZDDP does not have to be pre-mixed into a base lubricant prior to adding to the drilling fluid. A comparison was made between ZDDP that was blended into a lubricant vs. ZDDP and lubricant added separately into a drilling fluid. Blended lubricants have a ratio 9 parts lubricant to 1 part ZDDP. Lubricants were tested in a potassium silicate-based drilling fluid containing 8% potassium silicate by volume and a sodium silicate-based drilling fluid containing 8% sodium silicate.

TABLE 4

Co-efficient of Friction at 150 in/lbs

|  | CoF |
|---|---|
| Potassium Silicate Drilling fluid (no lubricant) | 0.45 |
| 2% Estadrill | 0.29 |
| 1.8% Estadrill, 0.2% ZDDP (added separately to drilling fluid) | 0.22 |
| 2% Estadrill:ZDDP (blended 9:1 lubricant:ZDDP) | 0.21 |
| 2% Radiagreen | 0.34 |
| 1.8% Radiagreen, 0.2% ZDDP (added separately) | 0.25 |
| 2% Radiagreen:ZDDP (blended) | 0.26 |
| Sodium Silicate Drilling fluid (no lubricant) | 0.48 |
| 2% HPH-1 | 0.46 |
| 1.8% HPH-1, 0.2% ZDDP (added separately) | 0.29 |

TABLE 4-continued

Co-efficient of Friction at 150 in/lbs

|  | CoF |
|---|---|
| 2% HPH-1:ZDDP (blended) | 0.27 |
| 0.5% 120 L | 0.44 |
| 0.45% 120L:0.05% ZDDP (added separately) | 0.35 |
| 0.5% 120L:ZDDP (blended) | 0.33 |

EXAMPLE 5

Glycol Based Drilling Fluids

Glycol-based drilling fluids represent a class of water based drilling fluids that provide shale inhibition. A glycol based drilling fluid was formulated with 8% v/v polyethylene glycol (PEG 300), polymers, water and simulated drill solids. Lubricity testing was done on ZDDP by itself as well as lubricant blended with ZDDP (9:1). Table 5 shows a reduction in the CoF when ZDDP is added to the lubricant.

TABLE 5

CoF for a Glycol Based Drilling Fluid
CoF in a glycol based drilling fluid

|  | 150 lb/in | 300 lb/in | 400 lb/in |
|---|---|---|---|
| water | 0.37 | — | — |
| glycol mud - no lubricant | 0.12 | >0.50 | >0.50 |
| +0.2% ZDDP | 0.06 | 0.28 | 0.34 |
| +2% ZDDP | 0.02 | 0.05 | 0.15 |
| +2% EZ Drill | 0.04 | 0.10 | 0.14 |
| +2% EZ Drill:ZDDP | 0.02 | 0.05 | 0.15 |
| +2% Coastalube | 0.07 | 0.18 | 0.24 |
| +2% Coastalube:ZDDP | 0.07 | 0.14 | 0.17 |
| +2% Estadrill | 0.05 | 0.18 | 0.20 |
| +2% Estadrill:ZDDP | 0.03 | 0.06 | 0.15 |
| +2% Radiagreen | 0.07 | 0.18 | 0.25 |
| +2% Radiagreen:ZDDP | 0.03 | 0.09 | 0.16 |

EXAMPLE 6

Improved Lubricity in Amine-based Drilling Fluids

Amine-based drilling fluids represent another class of inhibitive water based drilling fluids. An amine based drilling fluid was formulated with 0.5% hexadiamine v/v, polymers, water and simulated drill solids. pH of the drilling fluid was adjusted to 9.6. Lubricity testing was done on ZDDP by itself as well as lubricant blended with ZDDP (9:1). Table 6 shows a reduction in the CoF of the drilling fluid with the addition of ZDDP.

TABLE 6

CoF for an Amine Based Drilling Fluid
CoF Amine Based Drilling Fluid

|  | 150 lb/in | 300 lb/in |
|---|---|---|
| water | 0.36 | >0.50 |
| Amine System (no lubricant) | 0.18 | >0.50 |
| 2% ZDDP | 0.11 | 0.30 |
| EZ Drill | 0.19 | 0.30 |
| EZ Drill:ZDDP | 0.09 | 0.19 |

EXAMPLE 7

Improved Lubricity in Formate-based Drilling Fluids

Formate-based drilling fluids represent another class of inhibitive water based drilling fluids. A formate-based drilling fluid was formulated with 5% potassium formate v/v, polymers, water and simulated drill solids. Lubricity testing was done on ZDDP. The results show that the addition of ZDDP lowers the CoF of the formate-based drilling fluid.

TABLE 7

CoF for a Formate Based Drilling Fluid
CoF Formate Based Drilling Fluid

|  | 150 lb/in | 300 lb/in |
| --- | --- | --- |
| water | 0.36 | >0.50 |
| K Formate (no lubricant) | 0.35 | >0.50 |
| 0.2% ZDDP | 0.11 | 0.35 |
| 2.0% ZDDP | 0.04 | 0.20 |
| Estadrill | 0.11 | 0.50 |
| Estadrill:ZDDP | 0.10 | 0.20 |
| Radiagreen | 0.07 | 0.27 |
| Radiagreen:ZDDP | 0.05 | 0.15 |

EXAMPLE 8

Improved Lubricity in Oil-based Drilling Fluids

Oil-based drilling fluids have naturally low CoF but deeper and extended drilling is creating the need for further reductions in torque and drag. An oil based drilling fluid was formulated according to the drilling fluids
Invert System:
Oil/Brine: 90/10
Brine: 30% $CaCl_2$
Primary Emulsifier: 11.5 $l/m^3$
Secondary Emulsifier: 5.7 $l/m^3$
Lime: 35 $kg/m^3$
Bentone 150: 10 $kg/m^3$
Hot-Rolling Procedure:
   350 ml Invert Sample
   16 hour@65° C.

ZDDP was tested as a standalone lubricant. Table 8 shows that ZDDP lowered the CoF of the drilling fluid.

TABLE 8

CoF for an Oil Based Drilling Fluid
CoF in a mineral oil based invert

|  | 150 lb/in | 300 lb/in | 400 lb/in | 500 lb/in | 600 lb/in |
| --- | --- | --- | --- | --- | --- |
| water | 0.37 | | | | |
| control (no lubricant) | 0.03 | 0.08 | 0.14 | 0.24 | 0.32 |
| +0.2% ZDDP | 0.03 | 0.06 | 0.11 | 0.18 | 0.25 |
| +2% ZDDP | 0.03 | 0.06 | 0.11 | 0.18 | 0.25 |

EXAMPLE 9

Improved Lubricity in Completion Fluids

A completion fluid is a solids-free liquid placed that is sometimes used at the final stages of well completion. Completion fluids are typically brines (chlorides, bromides and formates). The fluid is meant to be chemically compatible with the reservoir formation and fluids, and is typically filtered to a high degree to avoid introducing solids to the near-wellbore area. ZDDP was tested in a saturated solution of potassium formate (75% active) and potassium formate diluted 1:1 with water. Table 9 shows that the CoF of the completion fluid was reduced with the addition of ZDDP.

TABLE 9

CoF for a Formate Completion Fluid
CoF Formate Completion Fluid

|  | 150 lb/in | 300 lb/in | 400 lb/in |
| --- | --- | --- | --- |
| water | 0.36 | — | — |
| k formate (75%) | 0.055 | 0.13 | 0.24 |
| k formate + 0.2% ZDDP | 0.034 | 0.10 | 0.21 |
| k formate + 2% ZDDP | 0.013 | 0.07 | 0.15 |
| k formate (37.5%) | 0.20 | 0.45 | >0.50 |
| k formate + 0.2% ZDDP | 0.12 | 0.32 | >0.50 |
| k formate + 2% ZDDP | 0.065 | 0.29 | 0.42 |
| k formate + 5% ZDDP | 0.013 | 0.13 | 0.28 |

EXAMPLE 10

Anti-accretion Properties of ZDDP

Shale accretion was measured by observing the adhesion of clay onto a metal pipe. Oxford shale was sized through 6-8 mesh screen. Oxford shale is noted for its "stickiness" and is a standard shale for measuring accretion. 20 g of sized shale was placed in a 500 ml steel aging cell. A ¾"×6" steel rod was cleaned and placed in the aging cell. 350 ml of water, water and 0.2% ZDDP and water and 2.0% ZDDP were added to the aging cells. Samples were hot rolled for 16 hrs at 120 F. Steel rods were observed for clay particles sticking to the steel. The rod that was rolled in water was covered in a fine film of clay. FIG. 1 shows the effect of the addition of ZDDP to water in reducing the extent of clay adhesion to the steel rod. Increasing amounts of ZDDP showed a stark reduction in the extent of clay adhesion on the rod.

Inclusion of a document in this specification is not an admission that the document represents prior invention or is prior art for any purpose.

Preferred embodiments of this invention are described herein, including the best mode known to the inventors for carrying out the invention. Variations of those preferred embodiments may become apparent to those of ordinary skill in the art upon reading the foregoing description. The inventor expects skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law.

I claim:

1. A drilling fluid comprising a non-sulfurized lubricant and further comprising a metal thiophosphate composition.

2. The drilling fluid of claim 1 wherein said drilling fluid is a water based drilling fluid.

3. The drilling fluid of claim 2 wherein said drilling fluid is selected from the group of water based drilling fluids consisting of glycol based drilling fluids, amine based drilling fluids and formate based drilling fluids.

4. The drilling fluid of claim 3 wherein said drilling fluid is a polyethylene glycol based drilling fluid.

5. The drilling fluid of claim 3 wherein said drilling fluid is a hexanediamine based drilling fluid.

6. The drilling fluid of claim 2 wherein said drilling fluid is a potassium formate based drilling fluid.

7. The drilling fluid of claim 1 wherein said thiophos-phate is selected from the group consisting of monothiophosphates, dithiophosphates and polythiophosphates.

8. The drilling fluid of claim 7 wherein said metal is selected from the group consisting of zinc, cadmium, tin, iron, cobalt, nickel, vanadium, chromium, manganese, molybdenum, tungsten, titanium and zirconium.

9. The drilling fluid of claim 1 wherein said metal thiophosphate is zinc dialkyl dithiophosphate.

10. The drilling fluid of claim 1 wherein said drilling fluid is a silicate based fluid.

11. The drilling fluid of claim 1 wherein said drilling fluid is a potassium silicate based fluid.

12. The drilling fluid of claim 1 wherein said drilling fluid is a sodium silicate based fluid.

13. The drilling fluid of claim 1 wherein said drilling fluid is an oil-based drilling fluid.

* * * * *